July 4, 1950    A. E. CHURCH    2,513,284
JAW ADJUSTMENT FOR CHUCKS
Filed Oct. 8, 1948
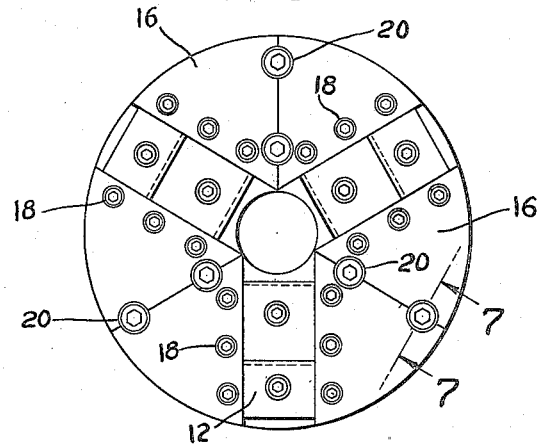
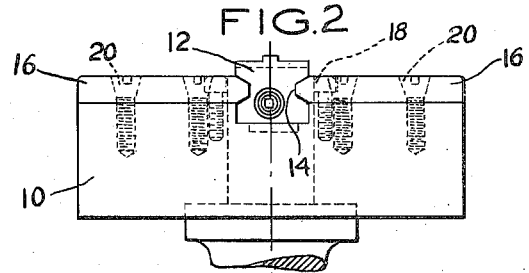
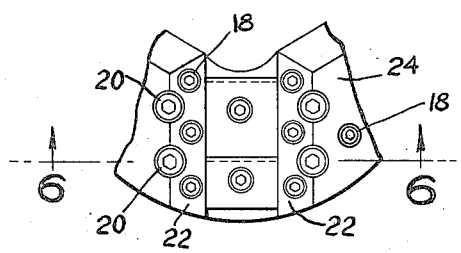
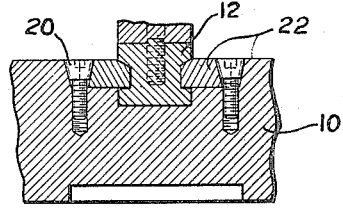
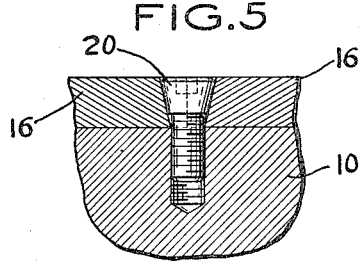
INVENTOR
A. E. CHURCH
BY Joseph K. Schofield
ATTORNEY Patented July 4, 1950

2,513,284

UNITED STATES PATENT OFFICE 2,513,284

JAW ADJUSTMENT FOR CHUCKS

Albert E. Church, New Britain, Conn., assignor to Union Manufacturing Company, New Britain, Conn., a corporation of Connecticut Application October 8, 1948, Serial No. 53,397

6 Claims. (Cl. 279—123)

This invention relates to rotatably mounted work clamping chucks and more particularly to means for supporting and guiding radially movable jaws therefor.

A primary object of the invention is to provide an improved chuck body adapted to be rotatably mounted and having a front plate preferably of wear resisting material such as steel, having guideways being formed therein for slidably supporting the radially movable work engaging jaws, the front plate preferably being made of a plurality of angular members fixedly secured to the body member in spaced apart relation to form jaw guideways, and the body member being made preferably of light weight material such as aluminum.

Another primary object of the invention is to provide spaced bearing members for the radially movable jaw members these bearing members forming the front plate of the chuck and so mounted that they may be adjusted limited distances to compensate for wear of the jaw guiding surfaces.

A feature of the invention that is important is that the chuck jaws have recesses extending along their opposite side surfaces within which fit portions of the adjustable bearing members mounted on and secured to the chuck body member.

Another object of the invention is to provide means permitting closely regulated adjustment of the front face chuck members engaging and guiding the chuck jaws so that wear along the surfaces of the jaws and the guiding or supporting members may be compensated.

With the above and other objects in view, the invention includes the features of construction and operation set forth in the following specification and illustrated in the accompanying drawings.

In the accompanying drawings annexed hereto and forming a part of this specification, I have shown the invention in several forms adapted to be embodied in a standard form of work clamping chuck for the work rotating spindle of a lathe or other machine tool, but it will be understood that the invention can be otherwise embodied and that the drawing is not to be construed as defining or limiting the scope of the invention, the claims appended to this specification being relied upon for that purpose.

In the drawing:

Fig. 1 is a front elevation of a standard form of chuck having the present invention applied thereto;

Fig. 2 is a side elevation of the chuck shown in Fig. 1;

Fig. 3 is a fragmentary view of a portion of a chuck showing a modified form of guiding and adjusting means;

Fig. 4 is a sectional view taken on the plane of line 6—6 in Fig. 3, and

Fig. 5 is a sectional view taken on the plane of line 7—7 in Fig. 3.

In the above mentioned drawings there have been shown several embodiments of the invention which are now deemed preferable, but it is to be understood that changes and modifications may be made within the scope of the appended claims without departing from the spirit of the invention.

Briefly, and in its broadest aspect, the invention may include the following principal parts: First, a chuck body member having means for connection to or mounting on a machine tool spindle; second, two or more radially movable jaw members on said chuck; third, plate members forming the front face of the chuck, these members being spaced to form guiding surfaces for the opposite side surfaces of the jaws; and fourth, screws having a tapered head contacting edges of adjacent plate members so that adjustment of the screws will vary the position of the edge surfaces of the plates relative to the guiding surfaces of the jaws.

Referring more in detail to the figures of the drawing and first to the form of the invention shown in Figs. 1 and 2, it will be seen that the chuck comprises a body member 10 adaptable for attachment to a machine tool spindle or other rotary member in any preferred manner. Mounted for radial movement on the front face members 16 of the body member are work clamping jaws 12, three of these jaws being indicated in Fig. 1. These jaws 12 may be individually or simultaneously actuated by any preferred means. As the construction of the jaws 12 and their operation to clamping and unclamping positions form no part of the present invention further description of these parts will not be necessary. The chuck shown in Figs. 1 and 2 is a simple form of scroll operated chuck.

To support and guide the jaws 12 in a manner to permit adjustment of their supporting members to compensate for wear of the contacting surfaces, the following means have been provided. On opposite sides of the jaw members 12 as shown in Figs. 1 and 2 are provided longitudinally extending recesses 14. These recesses 14 as shown in Fig. 1 have bevelled side surfaces, that is, their upper and lower surfaces are inclined to the side face of the jaw member 12. Engaging these oblique or bevelled surfaces of the recesses 14 on the jaw members are correspondingly shaped or bevelled surfaces extending along an edge of sectional plate members 16 fastened to the face of the body member 10. As shown in Fig. 1 there are two sectional plate members 16 disposed between adjacent jaws. Each of these sectional members is secured in fixed position to the body member 10 by a plurality of cap screws 18 preferably having their heads countersunk and positioned closely adjacent the edge engaging the recess in the jaw member 12.

To adjust the positions of the sectional plate members 16 slightly so that they may properly engage the surfaces of the recesses on the jaw members 12 when these surfaces become worn special screws 20 having conical heads are provided threaded into the body member 10 and having their conical surfaces disposed in contact with adjacent surfaces of the plate members 16. By downward adjustment of these screws 20 the plate members 16 may be adjusted slightly in directions to take up wear between the engaging surfaces of these members and the surfaces of the recesses formed on the jaw members. The clamping screws 18 for the plate members 16 fit into sufficiently large recesses so that limited adjustment of the plate members relative to the screws is permitted.

In the form of the invention shown in Fig. 1 the recesses 14 formed in the opposite side surfaces of the jaw members 12 are symmetrical, that is, the upper and lower bevelled surfaces of the recesses are equally inclined. In the form shown in Fig. 4 the recesses in the jaw members are inclined only on their upper surfaces their lower surfaces being horizontal or in parallelism with the direction of adjustment of the plate members 16.

In the embodiment of the invention shown in Figs. 3 and 4, the adjustable bearing members for taking up wear between the engaging surfaces of the jaws 12 and guiding members are in the form of strips 22 of wear resistant material adjacent the opposite sides of the jaw members 12. Each of these strips 22 has clamping screws 18 as defined above and have conical head screws 20 for adjusting them toward the adjacent surface of a jaw member 12. These latter screws 20 bear against sectional plate members 24 secured in fixed position to the face of the body member 10 or as shown in Fig. 2 against integral portions of the body member 10.

The embodiment of the invention shown in Figs. 1 and 2 is provided with fixed angular sectional portions 4 forming the front plate of the chuck, spaces being formed between the angular side surfaces of these members to provide the guiding surfaces for the jaws 6. To lighten these members 4 without unduly weakening them their front intermediate portions may be recessed by a milling operation as shown at 9.

I claim as my invention:

1. A chuck comprising a body member, a plurality of work clamping jaws movable radially therein, said jaws having parallel recesses extending along their opposite sides, at least one surface of said recess being bevelled, bearing members secured to said body member having surfaces contacting the surfaces of said recesses, and adjusting means for said bearing members.

2. A chuck comprising a body member, a plurality of work clamping jaws movable radially therein, said jaws having parallel recesses extending along their opposite sides, the upper and lower surfaces of said recess being bevelled, bearing members secured to said body member having surfaces contacting the bevelled surfaces of said recesses, and adjusting means for said bearing members.

3. A chuck comprising a body member, a plurality of work clamping jaws movable radially therein, said jaws having parallel recesses on their opposite sides, bearing members in the form of strips secured to said body member adjacent and on opposite sides of said jaws and having surfaces engaging surfaces of the recesses in said jaws, fixed members on said body member, and adjusting means for said strips, whereby said strips can be adjusted and secured in position in supporting and guiding positions relative to said jaws.

4. A chuck comprising a body member, a plurality of work clamping jaws movable radially therein, said jaws having parallel recesses on their opposite sides, bearing members adjustably secured to said body member and engaging said recesses, said adjusting means for said bearing members comprising conical headed screws having their conical portions disposed between surfaces of said bearing members and fixed portions of the body member, whereby adjustment of said screws will adjust the position of said bearing members into guiding and supporting positions for said jaws.

5. A chuck comprising a body member, a plurality of work clamping jaws movable radially thereof, said jaws having parallel interengaging surfaces on their opposite sides, and bearing members secured to said body member and engaging the side surfaces of said jaws, the bearing members forming collectively the front plate of said chuck.

6. A chuck comprising a body member of light metal, a plurality of jaws movable radially thereof, said jaws having parallel interengaging surfaces on their opposite sides, and bearing members formed of wear resisting material secured to said body member and engaging the side surfaces of said jaws, the bearing members being spaced apart to form a guideway for said jaws and collectively forming the front plate of said chuck.

ALBERT E. CHURCH.

REFERENCES CITED

The following references are of record in the file of this patent:

UNITED STATES PATENTS

| Number | Name | Date |
| --- | --- | --- |
| 1,071,289 | Bader | Aug. 26, 1913 |
| 1,500,637 | Pillar | July 8, 1924 |
| 2,460,577 | Hohwart et al. | Feb. 1, 1949 |

FOREIGN PATENTS

| Number | Country | Date |
| --- | --- | --- |
| 656,664 | Germany | Jan. 27, 1938 |